United States Patent
Brooks

(10) Patent No.: US 7,080,814 B1
(45) Date of Patent: Jul. 25, 2006

(54) ASSEMBLY CONFIGURABLE AS DISPLAY STAND OR A WHEELED CARRIER

(76) Inventor: Phillip A. Brooks, 4805 SW. Wichita St., Tualatin, OR (US) 97062

( * ) Notice: Subject to any disclaimer, the term of this patent is extended or adjusted under 35 U.S.C. 154(b) by 144 days.

(21) Appl. No.: 10/976,673

(22) Filed: Oct. 29, 2004

(51) Int. Cl.
*A47B 19/00* (2006.01)

(52) U.S. Cl. ............... 248/441.1; 248/460; 280/47.18

(58) Field of Classification Search ............ 248/158, 248/165, 166, 188.6, 177.1, 178.1, 441.1, 248/443, 460, 463; 280/47.131, 47.17, 47.18, 280/47.24, 47.27
See application file for complete search history.

(56) References Cited

U.S. PATENT DOCUMENTS

| | | | | |
|---|---|---|---|---|
| 3,826,513 | A * | 7/1974 | Wolf | 280/79.11 |
| 5,529,322 | A * | 6/1996 | Barton | 280/30 |
| 6,371,495 | B1 * | 4/2002 | Thompson | 280/30 |
| 6,578,856 | B1 * | 6/2003 | Kahle | 280/30 |

\* cited by examiner

Primary Examiner—A. Joseph Wujciak, III
(74) Attorney, Agent, or Firm—Law Office of Timothy E. Siegel; Timothy E. Siegel

(57) ABSTRACT

A multipurpose assembly that can be placed both into a display stand configuration and, alternately, into a wheeled carrier configuration. The assembly includes a display stand configuration base and a support structure, anchored to and supported by the base, when the assembly is in the display stand configuration. In addition, a display platform is vertically hinged to the support structure, whereby the support structure can be vertically rotated about the display platform. The display platform has a nominal platform bottom, which is a bottommost portion of the display platform when the assembly is in the display stand configuration. Further, a set of wheels is attached to the nominal platform bottom, whereby the display stand may be placed into its wheeled carrier configuration by rotating the support structure relative to the display platform and placing the wheels onto ground. This permits the support structure to be used as a handle to guide the assembly in its wheeled carrier configuration.

8 Claims, 7 Drawing Sheets

ASSEMBLY CONFIGURABLE AS DISPLAY STAND OR A WHEELED CARRIER

TECHNICAL FIELD

This invention relates to stands for supporting and displaying paper items such as sheet music or art work, or drawings.

BACKGROUND OF THE INVENTION

Performing musicians frequently play short engagements at different locations. The musicians must often transport instruments, music, music stands, and stage accessories for rehearsals and performances. During rehearsal and performance, all extra equipment not used by the performer such as cases and covers is generally stored outside the performing area. The space for such storage is often very limited. Conventional music stands are difficult to transport due to their size and rigid construction. Collapsible music stands heretofore available have to make a compromise between stability and portability. The most stable stands are only slightly more portable than their fixed counterparts and come close to these fixed stands in terms of stability. The most transportable stands collapse into highly compact configurations that are easily carried inside other cases or carriers, but provide limited stability under load and windy outdoor conditions, etc. These more portable stands also often compromise in the area of visual stage appeal, lending a less professional appearance to the performance. Similar constraints and issues are faced by people who do work on easels (such as artists or presenters) who must also carry extra items such as artist supplies, projectors, and presentation materials. These users also face issues regarding stability and portability of the stand and storage of a wheeled carrier.

Wheeled carriers are often used to assist in transport of equipment to and from a usage site. These have the following disadvantages: They are additional equipment that is not typically used for anything other than transporting equipment and materials to and from the usage site. As a result, they must be stored at the usage site, often when limited storage area is available. Although they may be light in weight, they do represent additional items that must be carried to and from the performance site. At times, when going up and down stairs for example, they must be lifted off the ground with all of their contents and represent additional weight. In addition, more rigid stands and easels are often difficult to stow on a wheeled carrier due to their bulky and awkward design.

SUMMARY OF THE INVENTION

In a first separate aspect, the present invention is a multipurpose assembly that can be placed both into a display stand configuration and, alternately, into a wheeled carrier configuration. The assembly includes a display stand configuration base and a support structure, anchored to and supported by the base, when the assembly is in the display stand configuration. In addition, a display platform is vertically hinged to the support structure, whereby the support structure can be vertically rotated about the display platform. The display platform has a nominal platform bottom, which is a bottommost portion of the display platform when the assembly is in the display stand configuration. Further, a set of wheels is attached to the nominal platform bottom, whereby the display stand may be placed into its wheeled carrier configuration by rotating the support structure relative to the display platform and placing the wheels onto ground. This permits the support structure to be used as a handle to guide the assembly in its wheeled carrier configuration.

In a second separate aspect, the present invention is a method of carrying away at least one item from a location at which a display stand has been needed. The method makes use of an assembly that may alternately be placed in a display stand configuration and in a wheeled carrier configuration. First, the assembly is placed into its display stand configuration and used as a display stand. Then, the assembly is placed into its wheeled carrier configuration and the item or items are placed onto the assembly. Finally, the loaded assembly is wheeled away from the location.

DETAILED DESCRIPTION OF THE PREFERRED EMBODIMENTS

Figure 6:
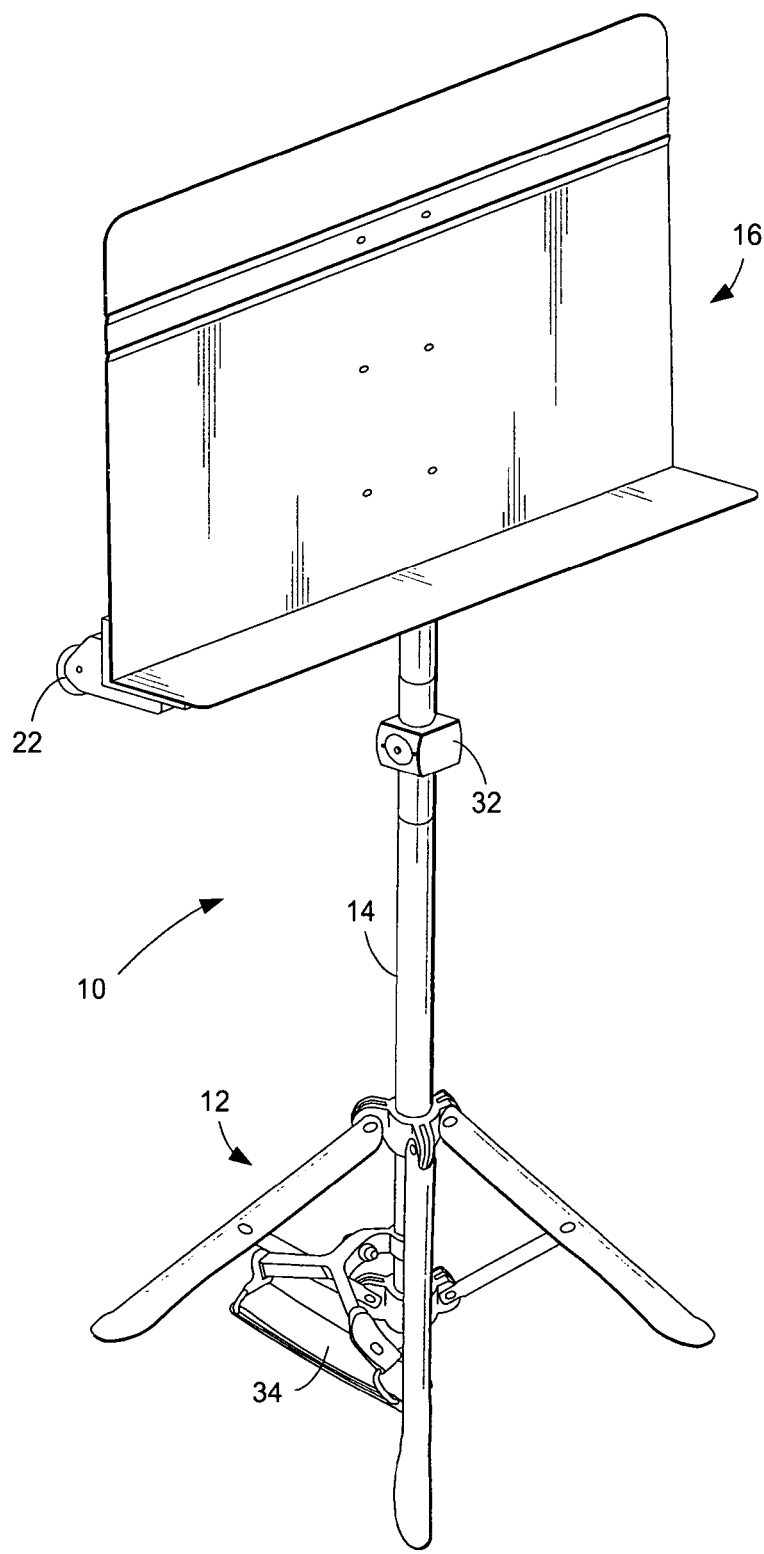
FIG. 6 is a front perspective view of the multipurpose assembly of FIG. 1 shown in its display stand configuration.
Figure 7:
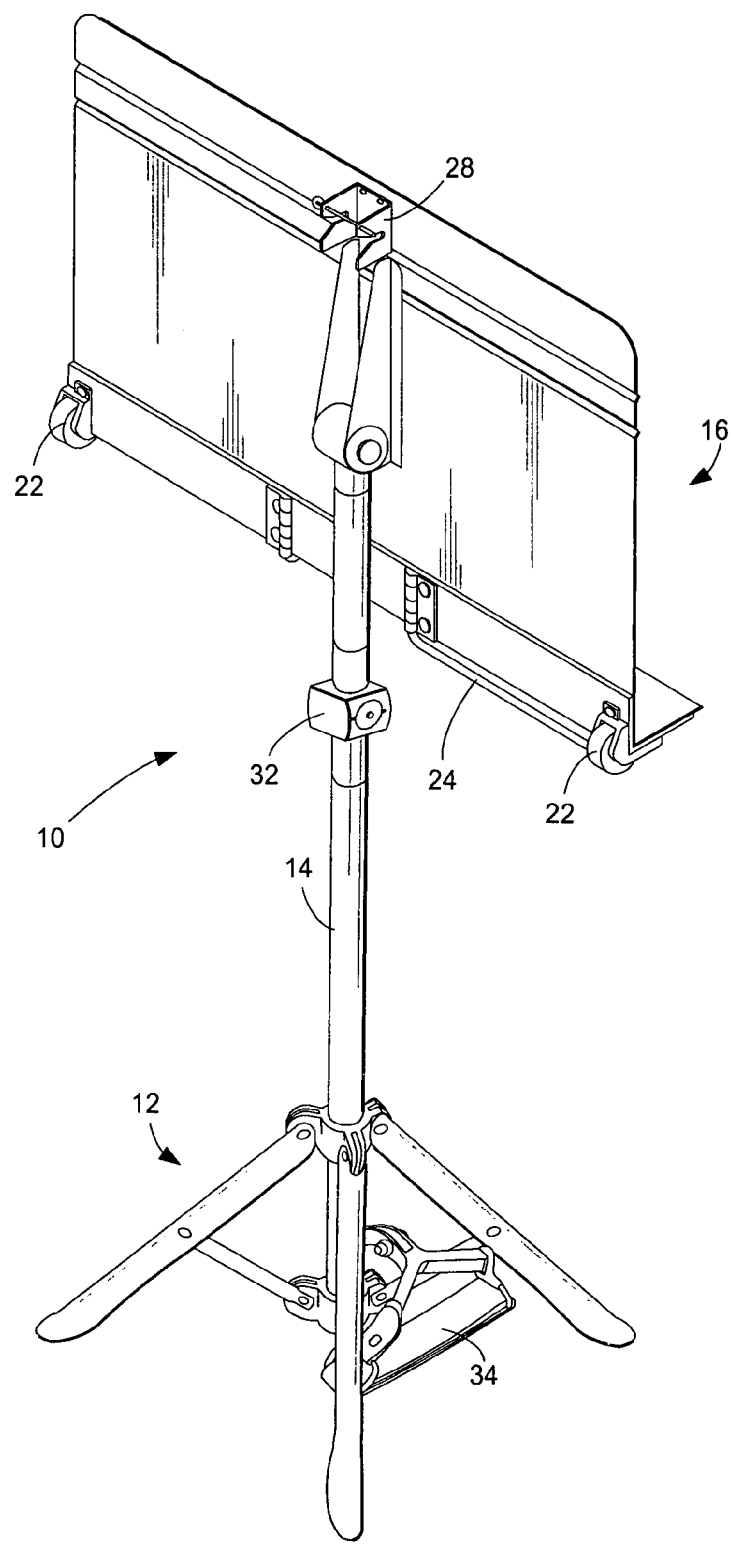
FIG. 7 is a rear perspective view of the multipurpose assembly of FIG. 1 shown in its music stand configuration

Referring to FIGS. 6 and 7, assembly 10 representing a preferred embodiment of the present invention, in display stand mode, includes a base 12, an upright support shaft or structure 14, and a display platform 16 connected to support structure 14 by way of a hinge 18. The display platform 16 includes a pair of wheels 22 mounted at its base that serve as the wheels 22 of the wheeled cart configuration FIG. 2. In one of the preferred embodiments, the wheels 22 are made of a soft rubber material. An alternate preferred embodiment of the present invention, the wheels 22 are small pneumatic tires.

Figure 1:
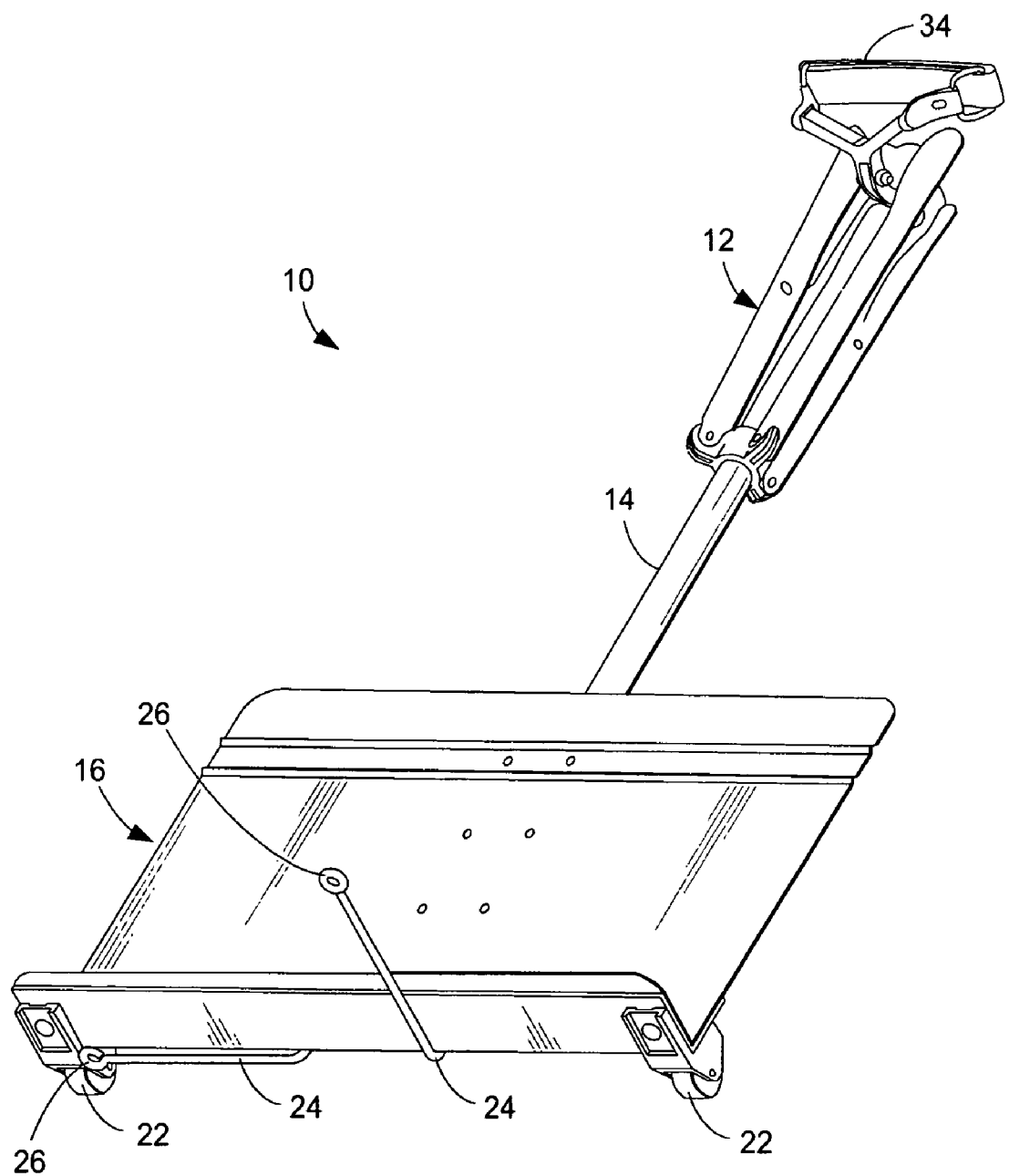
FIG. 1 is a front perspective view of a multipurpose assembly in accordance with the present invention shown in its wheeled carrier configuration.
Figure 2:
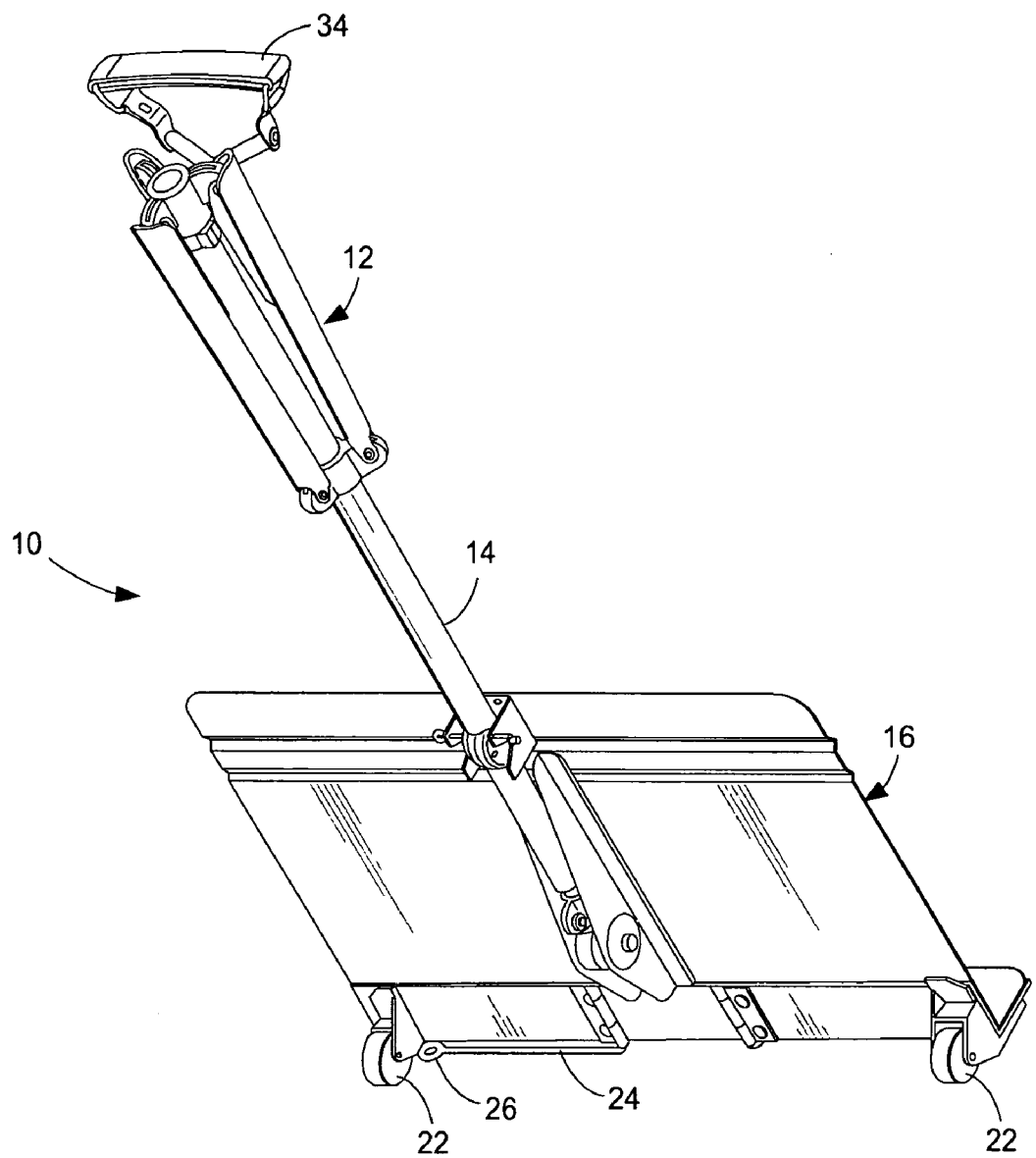
FIG. 2 is a rear perspective view of the multipurpose assembly of FIG. 1 shown in its wheeled carrier configuration.
Figure 3:
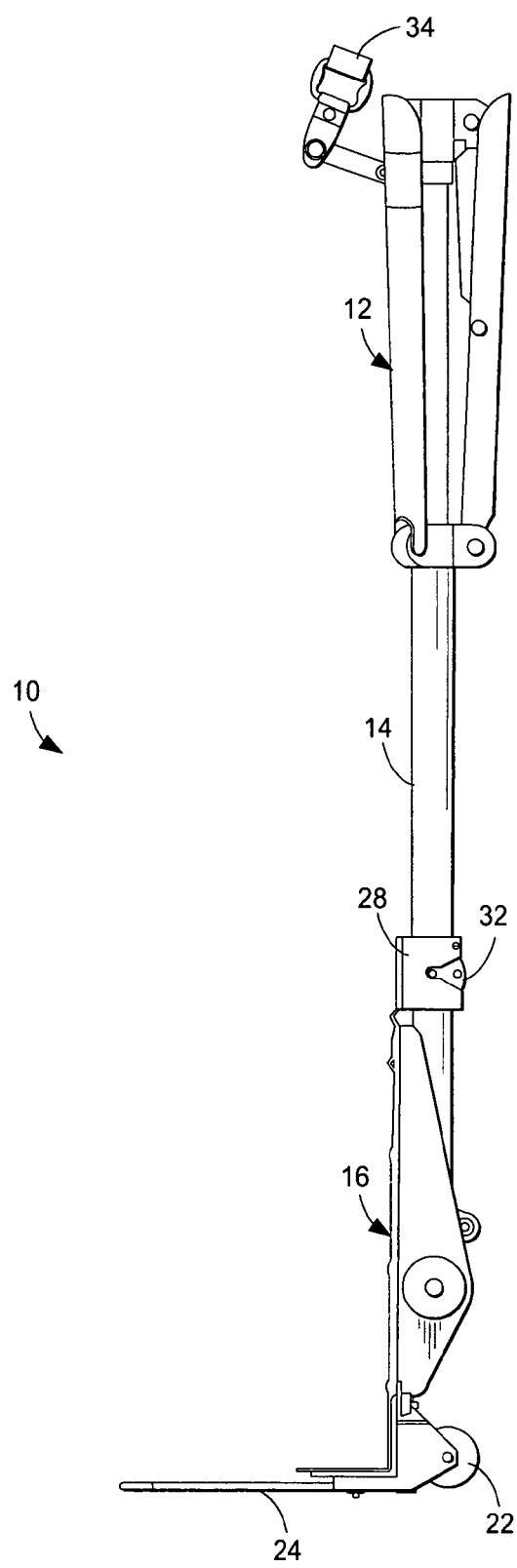
FIG. 3 is a side elevational view of the multipurpose assembly of FIG. 1 shown in its wheeled carrier configuration.
Figure 4:
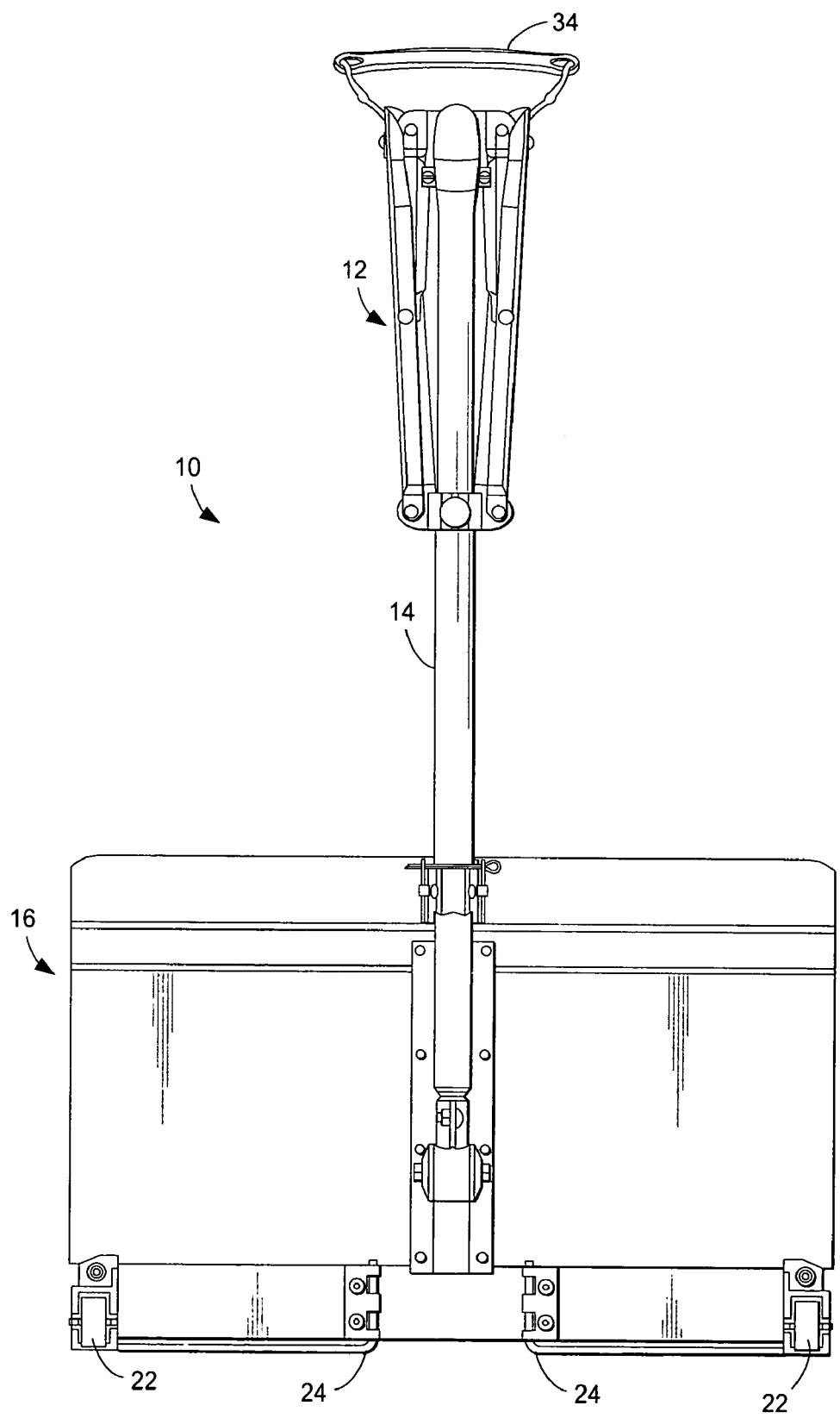
FIG. 4 is a rear elevational view of the multipurpose assembly in FIG. 1 shown in its wheeled carrier configuration.
Figure 5:
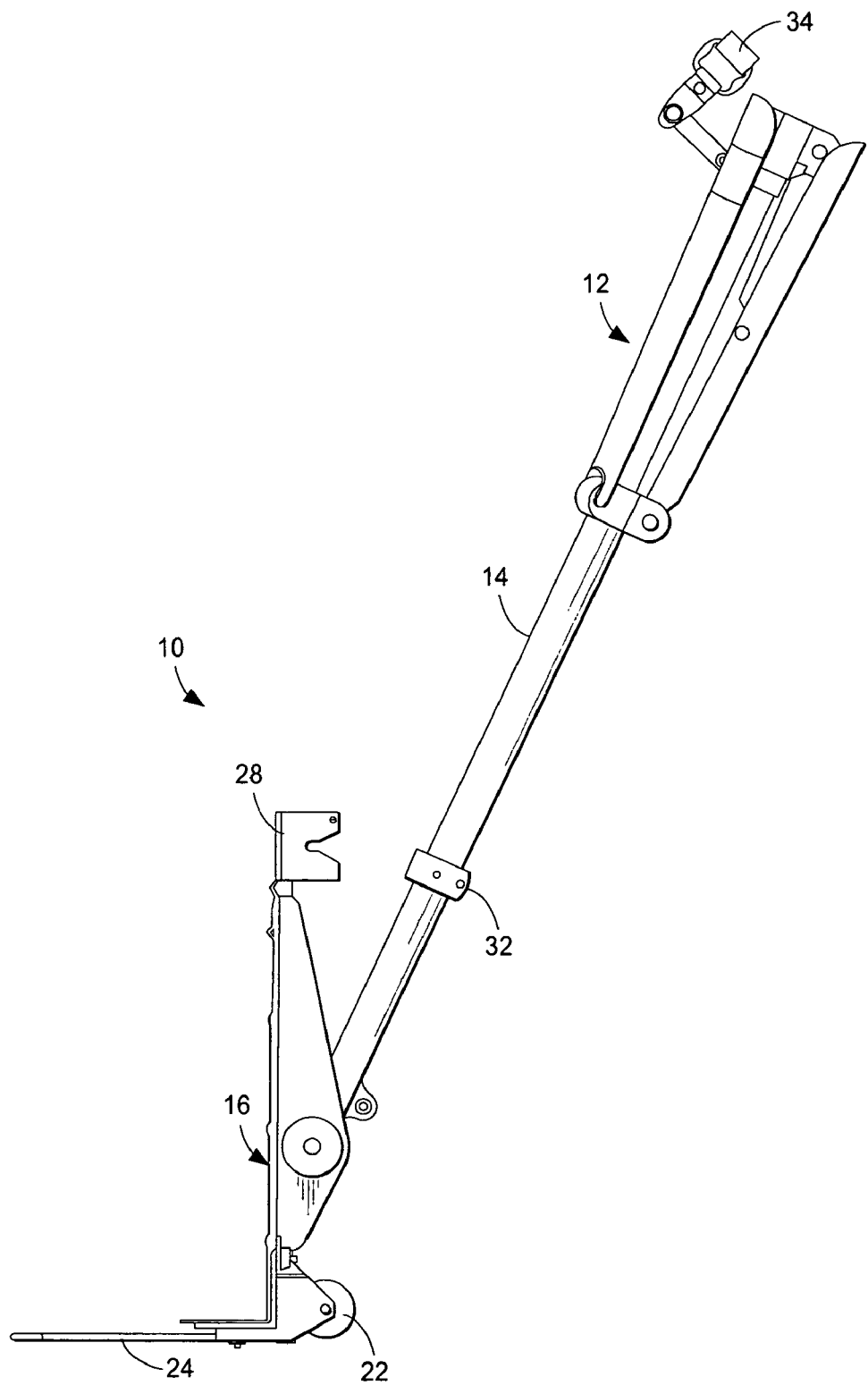
FIG. 5 is a side elevation view of the multipurpose assembly of FIG. 1 shown in a transitional mode.

The display platform 16 also includes extendable arms or extensions 24 (FIG. 7) that fold under the display platform 16 when it is in the musical stand configuration FIG. 1 and extend outward when it is in the wheeled cart configuration FIG. 2. All of the arms 24 each have a hole 26 (FIG. 2) at the end that is suitable for attaching cords or straps to secure additional baggage to the display platform for transport. The display platform 16 also includes a part of a locking mechanism 28 (FIG. 7) that joins with its mate on the shaft 32 (FIG. 7) to assure rigid connection between the normally adjustable and extensible shaft. The display platform 16 also includes a movable flap system (not shown) that serves to visually obscure the wheel system 22 during performance. This flap system (not shown) is connected to the shaft 14 in such a way that it lifts when the shaft 32 is extended into the upright wheeled cart configuration (FIG. 2).

Also, the display stand 16 includes a detachable satchel (not shown) that protects music stored on the display platform 16 during transport when the stand is in the wheeled carrier FIG. 2 configuration. There is a handle 34 attached at the base 12 end of the shaft 14 in such a way that it does not interfere with the collapsing operation of the base 12. The handle 34 serves to drag the stand when it is in the wheeled cart configuration FIG. 2 and also to lift the entire assembly when it is in the wheeled cart configuration FIG. 2.

There are various possibilities with regard to the attachment and location of the wheels attached to the display platform. In one of the preferred embodiments the wheels are removable. In another, the wheels are on the upper part of the display platform. There are various possibilities with regard to the supporting structure of the stand. In one preferred embodiment the supporting structure is a collapsible tripod. In another preferred embodiment it consists of multiple legs instead of a single stem. In these embodiments the base collectively includes the portions of the legs that are proximal to the ground when assembly 10 is in use as a display stand.

There are various possibilities with regard to the handle used during transport of the display platform. The handle may be attached to the supporting structure or may be a part of the structure (like a leg of a tripod) that is conveniently positioned as a handle. The manner of using the assembly 10 as a stand is similar to previously developed stands. The base 12 is placed on the ground. The display platform portion is adjusted to an appropriate height and angle. Objects such as music or drawing paper or presentation materials are placed on the display platform surface for viewing. In order to convert the stand to the wheeled carrier configuration, the displayed objects are removed. The tripod or supporting structure is collapsed. The display platform is inverted and locked to the stem. The entire assembly is inverted so that the display platform portion and its wheels are on the ground. The supporting arms are extended. Items are secured to the display platform portion and the user grasps the handle and pulls the invention along as a wheeled carrier.

Besides the objects and advantages of a sturdy easel or stand and a wheeled carrier described above, the advantages of the preferred embodiment are:

a) To provide a very sturdy stand or easel that is not difficult to transport.

b) To provide a wheeled carrier that does not have to be stored separately at the usage site.

c) To easily convert from a stand to a carrier without the use of any tools or assembly steps.

d) To provide wheeled carrier functionality without the need to store the bulky or awkward stand or easel on the wheeled carrier.

Thus, a sturdy, stable, attractive stand that can be easily transformed into a wheeled carrying device solves the tradeoff between portability and stability in a way that does not compromise size, rigidity and stability of the stand in any way. At the same time, it provides the user with a useful tool for carrying the other equipment and materials required at the usage site.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A multipurpose assembly that changeable between a display stand configuration and, a wheeled carrier configuration and comprising:
   (a) a display stand configuration base;
   (b) a support structure, anchored to and supported by said base, when said assembly is in said display stand configuration;
   (c) a display platform, vertically hinged to said support structure, whereby said support structure can be vertically rotated about said display platform, said display platform having a nominal platform bottom, which is a bottommost portion of said display platform when said assembly is in said display stand configuration; and
   (d) a set of wheels, attached to said nominal platform bottom, whereby said display stand may be placed into its wheeled carrier configuration by rotating said support structure relative to said display platform and placing said wheels onto ground, thereby permitting said support structure to be used as a handle to guide said assembly in its wheeled carrier configuration.

2. The assembly of claim 1, further comprising a locking device adapted to secure said support structure to said display platform when said assembly is said wheeled carrier configuration.

3. The assembly of claim 1 with a handle attached to said base and being adapted to facilitate pulling said assembly in said wheeled carrier configuration.

4. The assembly of claim 1 wherein said display platform includes at least one adjustable extension adapted to facilitate retention of items onto said display platform when said assembly is in said carrier configuration.

5. The assembly of claim 1 further including flexible longitudinal elements adapted to retain items stowed onto said assembly in said carrier configuration.

6. The assembly of claim 1 wherein said set of wheels is detachable.

7. The assembly of claim 1 wherein said display stand configuration is a music stand configuration.

8. The assembly of claim 1 wherein said display stand configuration is an easel configuration.

* * * * *